(12) United States Patent
Menβen et al.

(10) Patent No.: US 9,095,806 B2
(45) Date of Patent: Aug. 4, 2015

(54) FILTER DEVICE

(75) Inventors: Jörg Menβen, Tamm (DE); Stefan Becker, Mannheim (DE); Kai Hilarius, Römerberg (DE); Oliver Steins, Römerberg (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 645 days.

(21) Appl. No.: 13/501,352

(22) PCT Filed: Oct. 12, 2010

(86) PCT No.: PCT/EP2010/065292
§ 371 (c)(1),
(2), (4) Date: May 23, 2012

(87) PCT Pub. No.: WO2011/045326
PCT Pub. Date: Apr. 21, 2011

(65) Prior Publication Data
US 2012/0233972 A1    Sep. 20, 2012

(30) Foreign Application Priority Data

Oct. 12, 2009 (DE) .......................... 10 2009 049 170
Apr. 8, 2010 (DE) .......................... 10 2010 014 279

(51) Int. Cl.
| | |
|---|---|
| *B01D 51/00* | (2006.01) |
| *B01D 50/00* | (2006.01) |
| *B01D 45/16* | (2006.01) |
| *F02M 35/02* | (2006.01) |
| *F02M 35/024* | (2006.01) |

(52) U.S. Cl.
CPC .............. *B01D 50/002* (2013.01); *B01D 45/16* (2013.01); *F02M 35/0203* (2013.01); *F02M 35/024* (2013.01); *B01D 2265/02* (2013.01); *B01D 2265/029* (2013.01); *B01D 2279/60* (2013.01)

(58) Field of Classification Search
CPC ........... B01D 46/0005; B01D 46/0004; B01D 46/2411; B01D 2279/60
USPC .................................... 55/347–348, 325, 503
See application file for complete search history.

(56) References Cited

U.S. PATENT DOCUMENTS

| | | | |
|---|---|---|---|
| 4,158,449 A * | 6/1979 | Sun et al. ........................ | 244/136 |
| 8,101,003 B2 * | 1/2012 | Krisko et al. ................... | 55/502 |
| 2005/0016138 A1* | 1/2005 | Sheidler et al. ................. | 55/347 |

* cited by examiner

*Primary Examiner* — Dung H Bui
(74) *Attorney, Agent, or Firm* — James Hasselbeck

(57) ABSTRACT

A filter housing (10) having a raw-side inlet (12) and a clean-side outlet (14) for media to be filtered and a forward-mounted part designed as a cyclone pre-separator (20) including at least one fastening region (32) of a first part (30) made substantially of plastic is fastened to the raw side, and a second part (40) braced between the first part (30) and the filter housing (10). The fastening region (32) of the first part (30) is screwed to the filter housing (10) using metal fastening elements (50, 54, 56, 60), and—at the upper side facing away from the filter housing (10) it has at least one pressing contour (70) for compensating for at least one dimension tolerance of the elements fastened together. The contour is substantially plastic material, which can be deformed by means of applying a force generated by the screwing together of the metal fastening elements (50, 52, 56, 60), in particular which can be melted.

10 Claims, 14 Drawing Sheets

FILTER DEVICE

CROSS REFERENCE TO RELATED APPLICATIONS

This application is US National Stage Entry of international patent application no. PCT/EP2010/065292, filed Oct. 12, 2010 designating the United States of America, the entire disclosure of which is incorporated herein by reference. Priority is claimed based on German patent application no. 10 2009 049 170.8, filed Oct. 12, 2009. Priority is further claimed based on German patent application no. 10 2010 014 279.4, filed Apr. 8, 2010. The entire disclosure of German patent applications 10 2009 049 170.8 and 10 2010 014 279.4 incorporated herein by reference.

TECHNICAL FIELD

The invention concerns a filter device, particular an air filter for an internal combustion engine.

PRIOR ART

An air filter that is provided with a pre-separator embodied as a multi-cell cyclone is disclosed, for example, in the publication DE 298 19 335 U1. Moreover, in the publication DE 10 2008 011 186 A1 a filter device for an internal combustion engine is disclosed. According to the prior art, the cyclone pre-separator is mounted by means of a radial clamping connection on the filter housing and secured by means of a screw connection. More precisely, for attachment of the cyclone pre-separator on the filter housing, the fastening area of the first cyclone component that is made of plastic material is clamped on the raw side of the filter housing. A disadvantage in this connection is that the plastic clamping connection may distort and become loose as a result of heating during operation of the air filter. Moreover, it may happen that the cyclone pre-separator is clamped only loosely on the filter housing as a result of tolerance of the dimensions of the fastening area. In case of an insufficient attachment of the first cyclone component on the filter housing the two cyclone components are not sufficiently clamped with each other and rattle upon operation of the internal combustion engine.

The invention has the object to further develop a filter device of the aforementioned kind in such a way that the cyclone pre-separator can be fastened in a simple and reliable way on the filter housing. In particular, the attachment of the cyclone pre-separator should compensate tolerances of the dimensions of the areas of the cyclone pre-separator that are made of plastic material and are to be connected to each other. Usual tolerances of these shaped plastic parts are, for example, disclosed in the standard DIN 16901, Shaped Plastic Parts, Tolerances and Approval Requirements for Length Dimensions, issue 11.1982, currently canceled without succession standard. Moreover, the object of the present invention is to further develop a filter device of the aforementioned kind such that the cyclone pre-separator can be mounted on and removed from the filter housing in a simple way and with minimal time expenditure.

SUMMARY OF THE INVENTION

Accordingly, the present invention is based on the front attachment part, in particular the cyclone pre-separator, being screwed fixedly by means of metal parts on the filter housing and having at least one compression contour for compensation of the tolerance of the dimensions of the elements to be screw-connected to each other, in particular the tolerances of the thickness of the fastening area of the first cyclone component and/or of the thickness of an area of the second cyclone component that is clamped between the fastening area and the filter housing and/or of the length of at least one metallic through bushing that is arranged in the fastening area and/or of the position of at least one metal bushing that is arranged in the filter housing. Alternatively, the front attachment part can also be formed as an intake screen that is in particular of a two-part configuration, wherein the first part is formed as a mounting frame and the second part is formed as a protective screen that is clamped between the first part and the filter housing. The embodiments that are disclosed in the following in the description and the claims apply likewise to this alternative wherein the mounting frame is used in place of the first cyclone component and the protective screen is used in place of the second cyclone component.

Metal fastening elements have the advantage that they remain stress-relieved when heated. The attachment of the cyclone pre-separator on the filter housing in accordance with the invention withstands thus without problems the operating temperatures of the internal combustion engine. As metal fastening elements for screw-connecting the fastening area with the filter housing, the filter device can have, for example, at least one screw and/or at least one washer, the metal bushing arranged in the filter housing and configured to receive the screw, and the metallic through bushing in the fastening area of the cyclone pre-separator. The metal bushing arranged in the filter housing is preferably a bushing for use in hot areas. Optionally, the metal bushing that is arranged in the filter housing can be formed monolithically together with the through bushing that is arranged in the fastening area of the cyclone pre-separator.

The through bushing has the purpose to absorb the generated pressure force when screwing in the screw into the metal bushing or, depending on the tolerance situation, to concentrate it onto the compression contour. The through bushing prevents in this way that the produced pressure force is transmitted onto another area of the cyclone pre-separator, for example, onto the fastening area, and causes deformation thereof.

The compression contour serves for compensating tolerances of the dimensions of at least one of the elements to be screw-connected to each other, in particular for compensation of the thickness of the fastening area and/or the thickness of an area of the second cyclone component to be clamped between the fastening area and the filter housing and/or the length of the through bushing and/or the position of the metal bushing. This tolerance compensation is enabled by the compression contour in that the compression contour extends in a direction toward the screw head beginning at the topside of the fastening area facing away from the filter housing, more precisely, beginning at the topside of a contact area that is facing away from the filter housing and that surrounds the through bushing and is embodied for supporting a head of the screw or a washer arranged between the screw head and the fastening area of the first cyclone component, is made substantially of plastic material, and is deformable, for example, meltable, by application of a force that is generated by screwing in the screw into the metal bushing.

The deformable or meltable compression contour effects a flush arrangement of the through bushing with the topside of the contact area that is facing away from the filter housing or the topside of the compression contour facing away from the filter housing. When the screw is in the tightened state, the screw head or the washer arranged underneath the screw head is in direct contact with the through bushing. The metal fastening elements are pressed tightly against each other, i.e., without a gap. The present invention enables thus a particularly reliable and stress-free attachment of the cyclone pre-separator on the filter housing.

According to a further advantageous embodiment of the present invention, the compression contour is formed monolithically together with the fastening area of the first cyclone component wherein the fastening area and the compression contour are substantially made of the same plastic material. Independent thereof or in connection therewith, the first cyclone component and/or the second cyclone component and/or the filter housing can be made substantially of the same plastic material as the compression contour.

The present invention is particularly beneficial when the first cyclone component is embodied as a cyclone top part comprising at least one cell tube and the second cyclone component is embodied as a cyclone bottom part comprising at least one immersion tube, in particular an immersion tube plate. The screw connection with tolerance compensation ensures that the cell tubes of the cyclone top part are resting on the plateau of the immersion tube plate. Without tolerance compensation, the cyclone top part and the cyclone bottom part might rattle or become loose and be insufficiently clamped in case of a corresponding tolerance situation.

The cyclone pre-separator is preferably embodied as a two-stage separator and has advantageously several small individual cyclones. Such a two-stage separator is disclosed, for example, in the publication DE 103 30 296 A1.

As a main filter element or primary element that is received in the filter housing, for example, a compact air filter with a plurality of passages that are closed off alternatingly at the inlet-side or outlet-side end faces or a multi-bellows filter, for example, a double bellows air filter, is conceivable. In this multi-bellows filter, for example, as disclosed in the publication DE 10 2008 011 186 A1, each filter bellows is embodied as a star-shaped filter with filter folds that are arranged in a star shape and are tacked together at the inflow side and/or at the outflow side. It is particularly advantageous when the end face edges of the filter folds are tacked together at the inflow side and/or at the outflow side, for example, by means of a so-called end face bonding.

The present invention has furthermore the object to further develop a filter device for an internal combustion engine such that the cyclone pre-separator can be attached in a reliable and simple way on the filter housing and can be mounted and removed with minimal time expenditure.

This object is solved by a filter device in which the fastening area of the first cyclone component is screw-connected with the filter housing by means of at least one screw, wherein the first cyclone component has at least one captive action device for the screw. This captive action device is formed as at least one projection that projects from a side wall of the first cyclone component. This projection is arranged in such a way on the side wall of the first cyclone component that, in case of an overhead positioning of the cyclone pre-separator and when releasing the screw, the screw is supported by the captive action device and the screw is prevented from falling out of the fastening area of the first cyclone component.

This captive action device for the screw is particularly beneficial upon release of the overhead first cyclone component from the filter housing or upon attachment of the overhead first cyclone component of the filter housing, for example, in case of overhead mounting of the cyclone pre-separator from the bottom to the top into the filter housing or when the cyclone pre-separator is placed head down during maintenance.

Advantageously, the captive action device is arranged at a defined spacing relative to the fastening area in such a way that in the mounted state a short leg of an angled hexagon recess wrench according to ISO 2936:2001-09 that engages the fastening screw projects past the captive action device such that the captive action device is located outside of the rotating area of the long part of the hexagon recess wrench.

According to an advantageous embodiment, the captive action device is comprised of at least two projections spaced apart from each other wherein the spacing of the respective projections relative to each other is smaller than the diameter of the head of the screw.

Alternatively, the captive action device can have at least one cutout whose diameter is smaller than the diameter of the head of the screw.

The captive action device enables easy mounting of the screw and facilitates in this way installation of the cyclone pre-separator in the filter device in case of mounting overhead because the cyclone pre-separator can be attached to the filter housing without the screw having to be manually held in position.

Moreover, the captive action device prevents the screw from falling out by itself when the cyclone pre-separator is released or detached from the filter, for example, when the cyclone pre-separator upon servicing is placed on its head.

According to a particularly preferred embodiment, the captive action device is at least partially formed of an elastic material, preferably of at least one plastic material or at least one plastic material mixture. Manufacture from elastic material has the advantage that when passing the screw through the captive action device the respective projections can at least partially be spread apart or the cutout can be widened. Also, when manufactured from elastic material, removal of the screw from the captive action device is enabled with somewhat increased force expenditure.

BRIEF DESCRIPTION OF THE DRAWINGS

As already explained above, there are various possibilities to configure and further develop the teachings of the present invention in an advantageous way. The further embodiments, features and advantages of the present invention will be explained in more detail inter alia with the aid of the embodiments illustrated in the FIGS. 1 to 16.

It is shown in.

Same or similar embodiments, elements or features are identified in FIGS. 1 to 17 with identical reference characters.

EMBODIMENT(S) OF THE INVENTION

Figure 1:
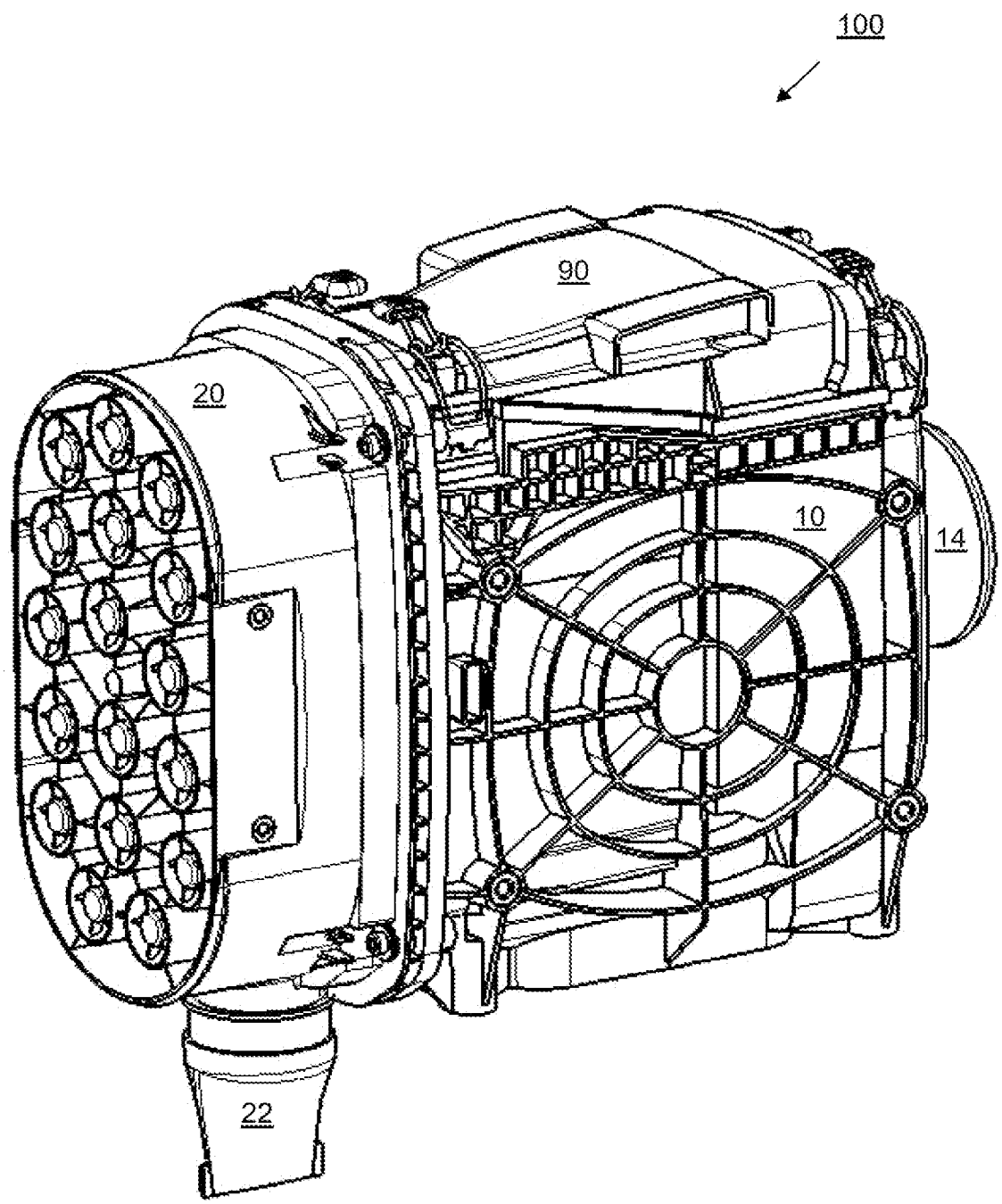
FIG. 1 in perspective illustration an embodiment of a filter device according to the present invention.
Figure 2:
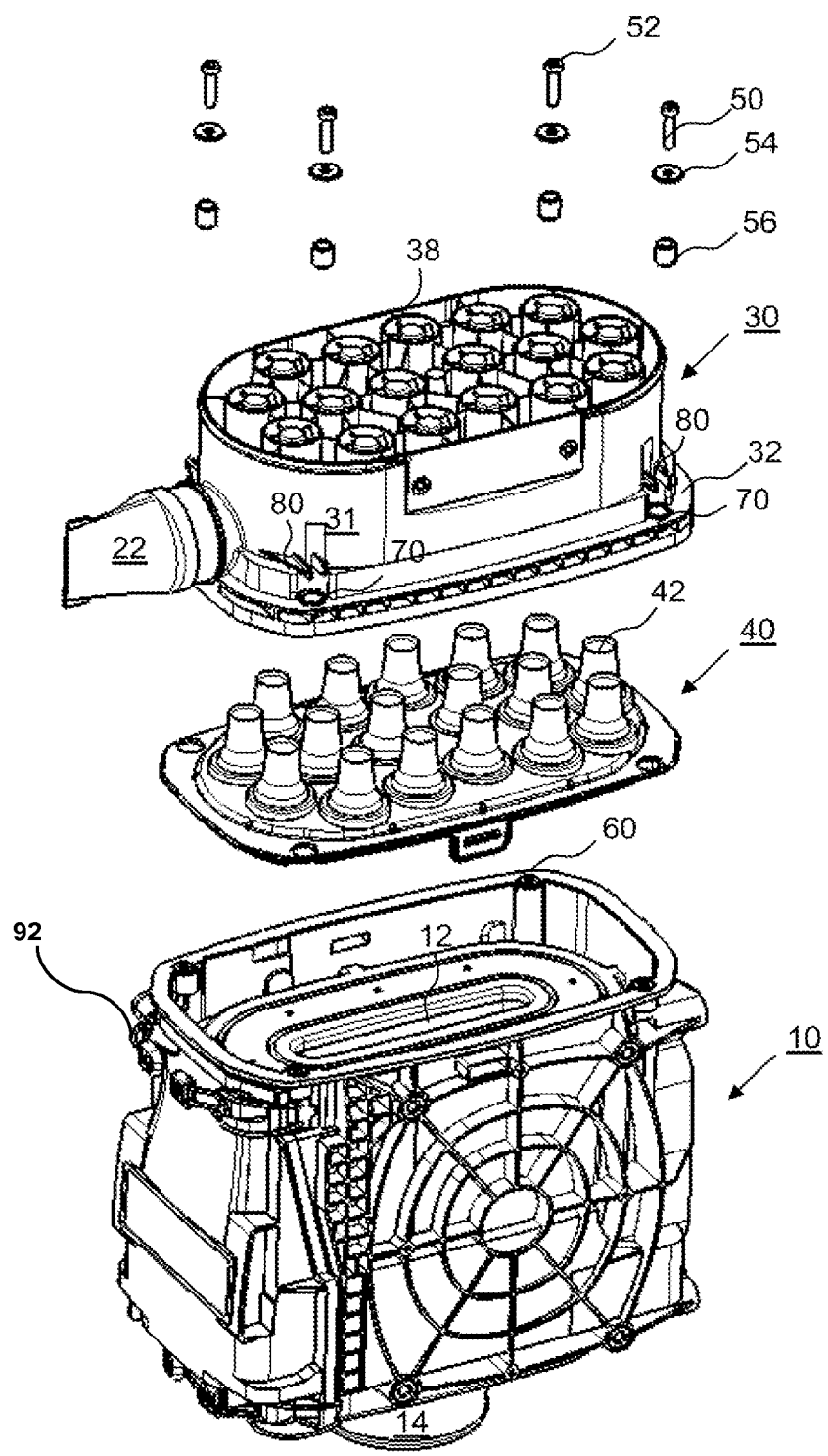
FIG. 2 in an exploded view the elements to be screw-connected of the cyclone pre-separator and of the filter housing of the filter device of FIG. 1.

The filter device 100 illustrated in FIGS. 1 and 2 is an air filter for an internal combustion engine, comprised of a filter housing 10 in which a main filter element is received, a cyclone pre-separator 20 as well as a secondary element arranged downstream and not illustrated. The filter housing 10 has on its circumferential side an opening that is covered by a cover 90 that by means of closure elements 92 is detachably arranged and closeable. By means of this opening in the wall surface of the filter housing, the main filter element and expediently also the secondary element can be inserted radially, or transversely to the axial direction, into the receiving space within the filter housing 10 or removed therefrom. The filter housing 10 has a raw-side inlet 12 and a clean-side outlet 14 for the media to be filtered.

The cyclone pre-separator 20 is arranged in the area of the inlet 12 of the filter housing 10. In the cyclone pre-separator 20, the dirt particles are moved outwardly and separated from the axially supplied air by centrifugal force in a rotating airstream. By means of discharge opening 22 that is oriented downwardly, the dirt particles that have been separated in the cyclone pre-separator 20 can be removed. The cyclone pre-separator 20 is embodied as a separate component that is connected with the filter housing 10. The connection of the cyclone pre-separator 20 with the filter housing 10 is realized by means of screws 50 passing through a fastening area 32 of the cyclone pre-separator 20 as well as through bushings 56 embodied for receiving the screws 50 and arranged on the cyclone pre-separator 20 and bushings 60 (compare FIG. 2) arranged at the filter housing and designed for use in hot areas. A washer 54 can be arranged between the screw head 52 and the corresponding through bushing 56, respectively. In an advantageous further embodiment, the washer 54 can be embodied monolithically together with the screw head 52. The fluid that has been prefiltered in the cyclone pre-separator 20 is axially supplied to the inflow side of the main filter element at the end face. Cyclone pre-separator 20, main filter element and secondary element can be positioned axially one after another and can be flowed through in axial direction in particular without deflection of the combustion air to be purified.

Figure 3:
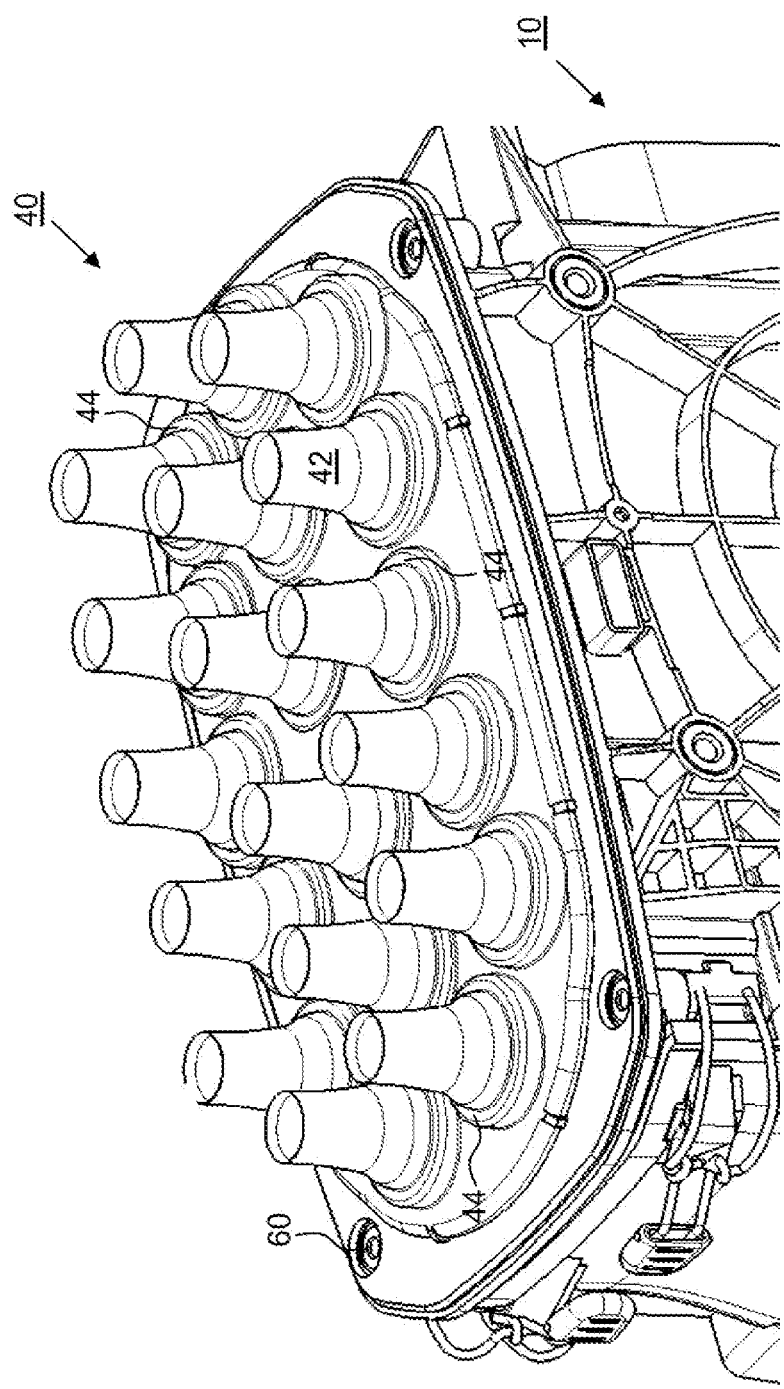
FIG. 3 in perspective illustration the second cyclone component of the filter device of FIG. 1 connected with the filter housing before attachment of the first cyclone component.

For producing the rotating airflow, the cyclone pre-separator 20 has a first cyclone component 30, i.e., a cyclone top part that is screw-connected with the filter housing, and a second cyclone component 40, i.e., a cyclone bottom part that is clamped between the cyclone top part 30 and the filter housing 10. The cyclone top part 30 of the cyclone pre-separator 20 that is embodied as a multi-cell cyclone has a plurality of cell tubes 38 and the cyclone bottom part is embodied as an immersion tube plate with a plurality of immersion tubes 42. In order for the two cyclone components 30, 40 not to rattle in operation of the internal combustion engine, it is important that the two cyclone components 30, 40 are sufficiently clamped despite the tolerances of the dimensions of the components to be screwed together, in particular of the fastening area 32 of the cyclone pre-separator 20 that is made of plastic material; of the area of the second cyclone component 40 that is formed of plastic material and is to be clamped between the fastening area 32 and the filter housing 10; of the metallic through bushing 56; and of the metal bushing 60 for use in hot areas. A sufficient clamping action is provided when the cell tubes 38 of the cyclone top part 30 are resting on the plateau 44 of the immersion tube plate 40. FIG. 3 shows the cyclone bottom part 40 that is clipped onto the filter housing 10 with the plateau 44 of the immersion tube plate 40.

In order to ensure a satisfactory relative clamping action of the two cyclone components 30, 40 even for a case of respective tolerances, the cyclone top part 30 has a preferably rib-shaped compression contour 70. This compression contour 70 extends beginning at the topside of the fastening area 32, more precisely beginning at a contact surface for the washer 54 or for the screw head 52, in the direction toward the washer 54 or the screw head 52 and is substantially made of plastic material.

The application of a defined force that is generated by screwing in the screw 50 into the metal bushing 60, in particular application of a pressure force of approximately 5 to 10 kilo Newton (kN), for example of approximately 7 kN, causes the plastic material of the compression contour 70 at least partially to deform, for example, to melt. This defined force is generated upon screwing in the screw 50 into the metal bushing 60, in particular upon compression of the metal fastening elements, for example, the screw 50, the washer 54, the through bushing 56, and the bushing 60 designed for use in hot areas, when the washer 54 is already resting on the compression contour 70 but is not yet in contact with the through bushing 56. Because of the applied pressure force the compression contour 70 deforms until the through bushing 56 is arranged flush with the top side 36 of the fastening area 32 facing away from the filter housing 10 or is flush with the topside of the compression contour 70 facing away from the filter housing 10. The deformation or melting of the compression contour 70 closes thus a gap 59 (compare FIG. 6) that is formed between the through bushing 59 and the bottom washer 54 or between the through bushing 56 and the screw head 52 due to tolerances of the elements 30, 40, 56, 60 that are to be screw-connected.

Figure 4:
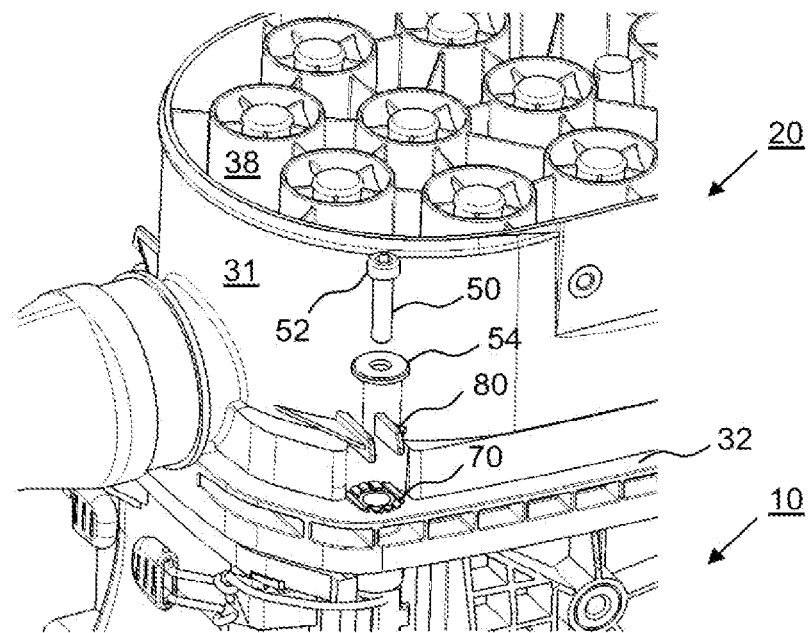
FIG. 4 in perspective illustration the two cyclone components and the filter housing of the filter device of FIG. 1 before screw-connecting the first cyclone component with the filter housing.
Figure 5:
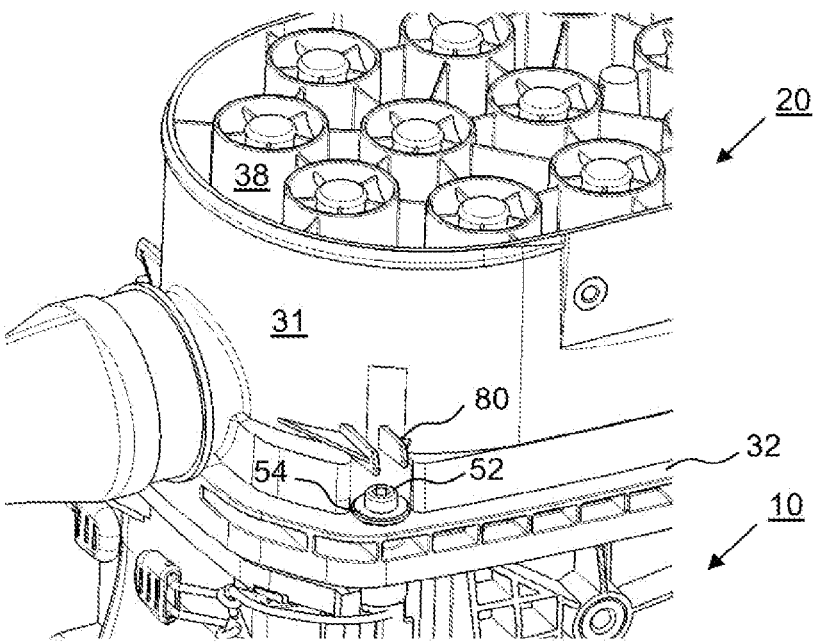
FIG. 5 in perspective illustration the two cyclone components and the filter housing of the filter device of FIG. 1 after screw-connecting the first cyclone component with the filter housing.

FIG. 4 shows the cyclone top part 30 with the filter housing-immersion tube plate combination before screw-connecting the metal fastening elements 50, 54, 56, 60 and FIG. 5 shows the cyclone top part 30 with the filter housing-immersion tube plate combination after screw-connecting the metal fastening elements 50, 54, 56, 60. The ribs of the compression contour 70 arranged in the area of the washer contact surface are designed such that upon tightening the screw 50 they are deformed by excess local tension. The compression contour 70 enables thus a screw connection with tolerance compensation and has the effect that the cell tubes 38 of the cyclone top part 30 are resting on the plateau 44 of the cyclone bottom part 40 and the metal fastening elements 50, 54, 56, 60 in the tightly screwed state are compressed flush with each other.

The compression contour 70 has preferably a strength or a height or a thickness of approximately 0.5 millimeter (mm) up to approximately 1.5 mm, in particular of approximately 0.8 mm.

Figure 6:
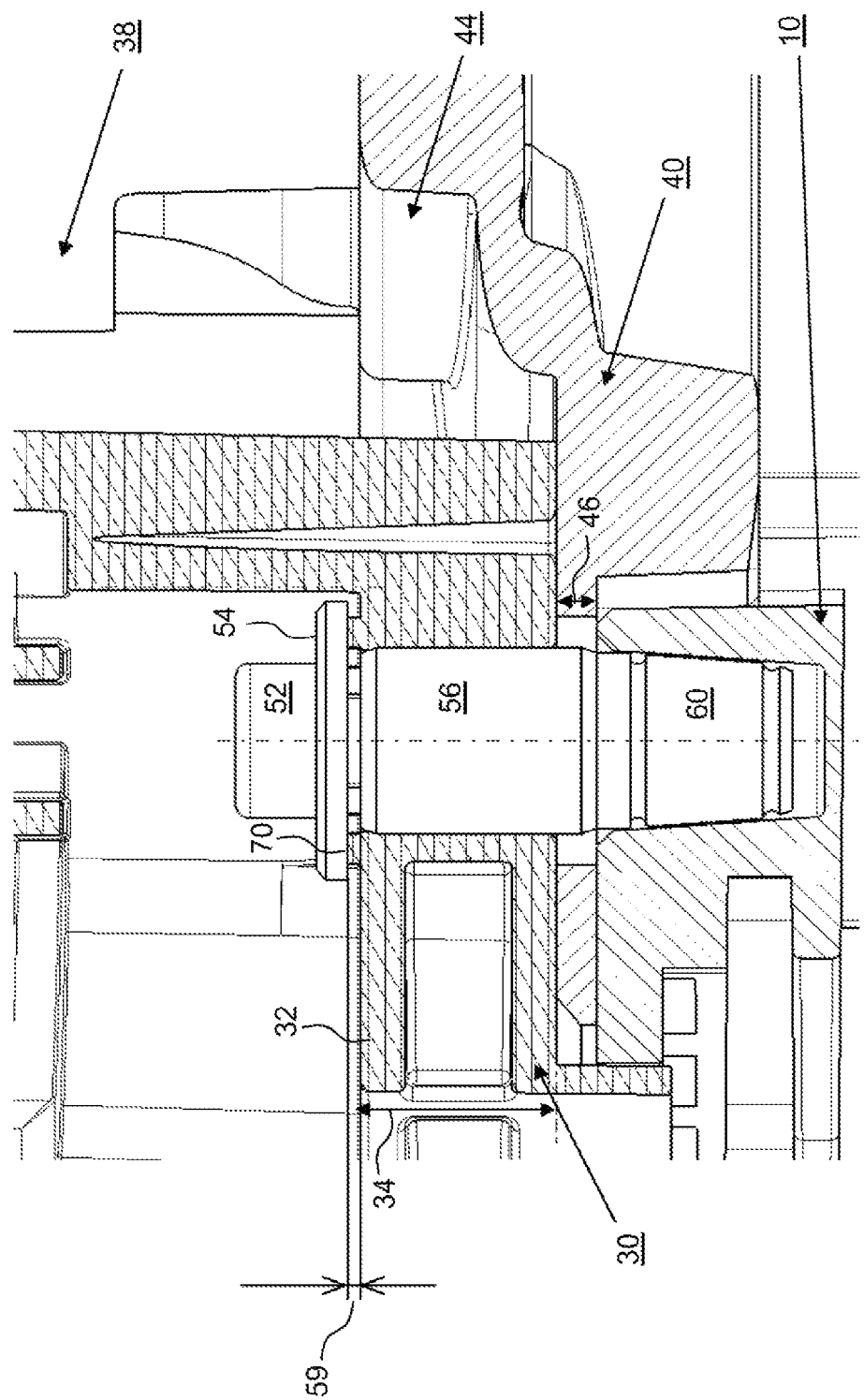
FIG. 6 in section illustration the two cyclone components and the filter housing of the filter device of FIG. 1 before screw-connecting the first cyclone component with the filter housing in case of maximum tolerances.

FIG. 6 shows a cross-section of the cyclone top part 30, of the cyclone bottom part 48 and of the filter housing 10 before tightening the screw 50 in a case of maximum tolerances, i.e., maximum thickness of the two cyclone components 30, 40, in particular maximum strength 34 of the fastening area 32 and maximum strength of an area of the cyclone bottom part 40 arranged between the fastening area 32 in the filter housing 10 and minimal length of the through bushing 56 and/or minimal manufacturing-related projection of the hot-use bushing 60 from its receiving bore. As a result of the maximum or minimum tolerances of the elements 30, 40, 56, 60 to be screw-connected, a maximum gap 59 results that, for example, has a length of approximately 1 mm.

Figure 7:
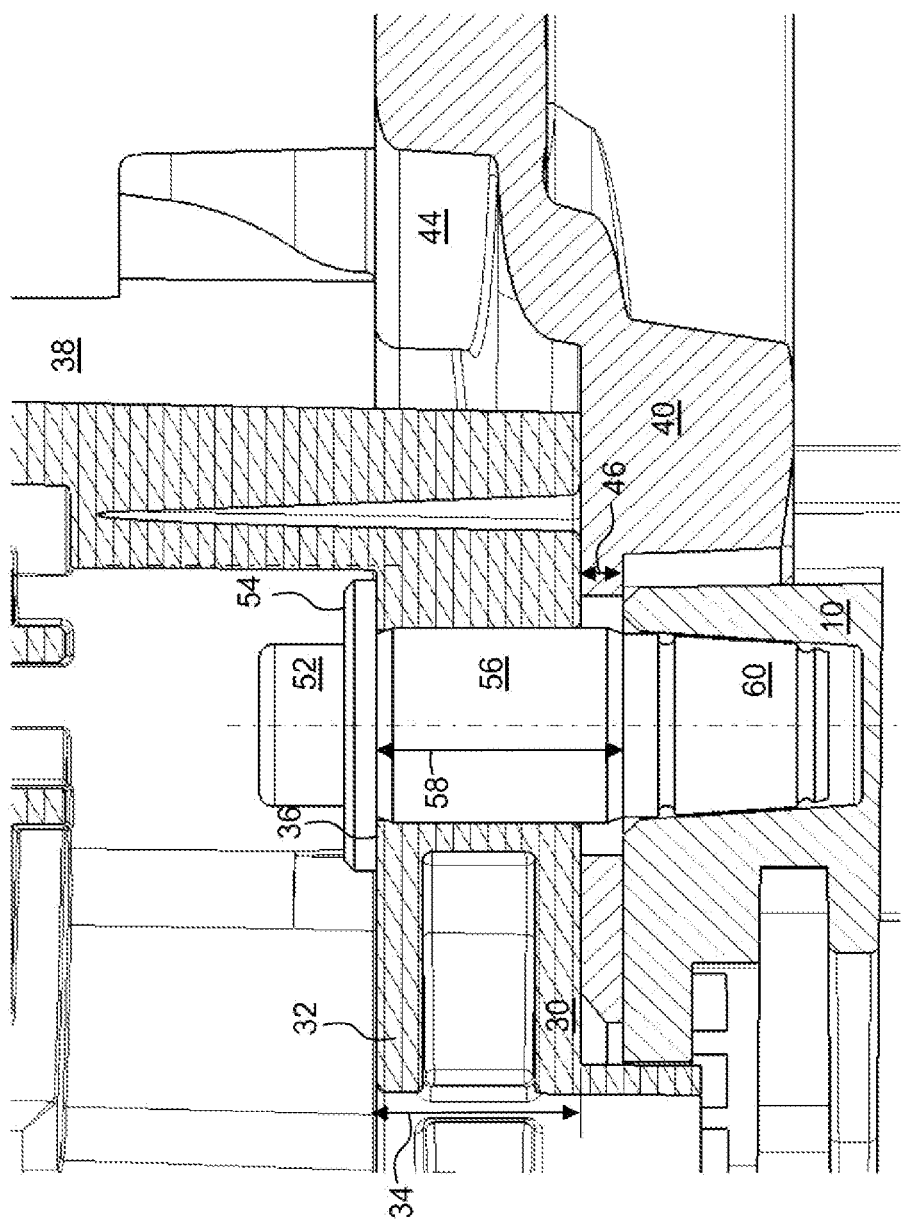
FIG. 7 in section illustration the two cyclone components and the filter housing of the filter device of FIG. 1 after screw-connecting the first cyclone component with the filter housing in case of maximum tolerances.

FIG. 7 shows a cross-section of the cyclone top part 30, the cyclone bottom part 48 and the filter housing 10 after tightening the screw 50 in case of maximum tolerances of the elements 30, 40, 56, 60 to be screw-connected. The ribs of the compression contour 70 are completely compressed or melted. The metal fastening elements 50, 54, 56, 60 are fixedly compressed relative to each other, in particular no gap between the through bushing 56 and the washer 54 is present.

Figure 8:
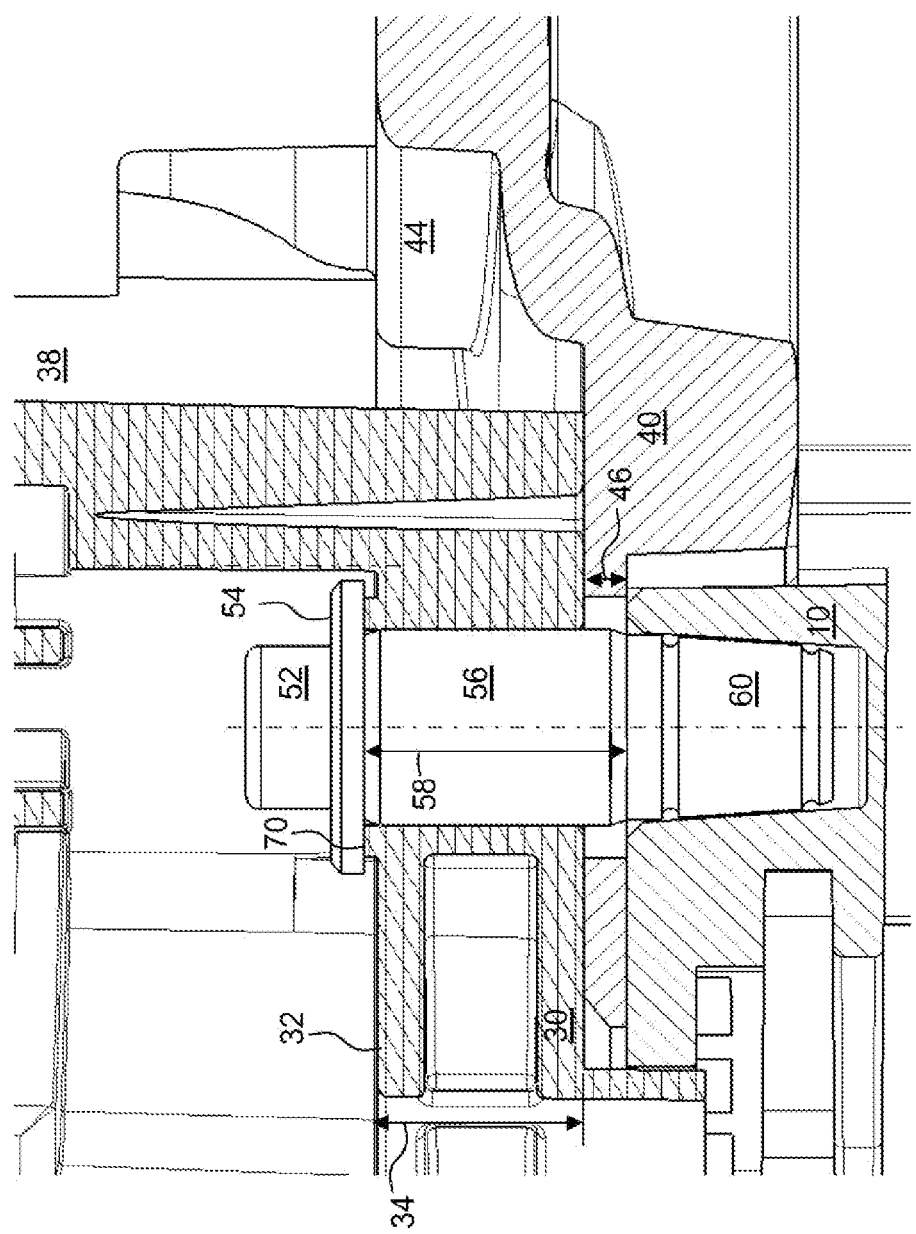
FIG. 8 in section illustration the two cyclone components and the filter housing of the filter device of FIG. 1 before and after screw-connecting the first cyclone component with a filter housing in case of minimum tolerances.

FIG. 8 shows the compression of the cyclone top part 30, the cyclone bottom part 40, and the filter housing 10 before and after tightening of the screw 56 in case of minimal tolerances of the elements 30, 40, 56, 60 to be screw-connected. The case of minimum tolerances exists in case of minimal thickness of the two cyclone components 30, 40, in particular minimal strength of the fastening area 32 and minimal strength 46 of the area of the cyclone bottom part 40 arranged between the fastening area 32 and the filter housing 10 and/or maximum length of the through bushing 56 and/or maximum manufacture-caused projection of the hot-use bushing 60 from its receiving bore. When the screw 50 is tightened, the plastic material of the compression contour 70 will not deform because the metal fastening elements 50, 54, 56, 60 have no air gap already before tightening the screw 50 and are fixedly compressed with each other after tightening of the screw. Already before tightening the screw 50 there is thus no gap 59 between the through bushing 56 and the washer 54.

Figure 9:
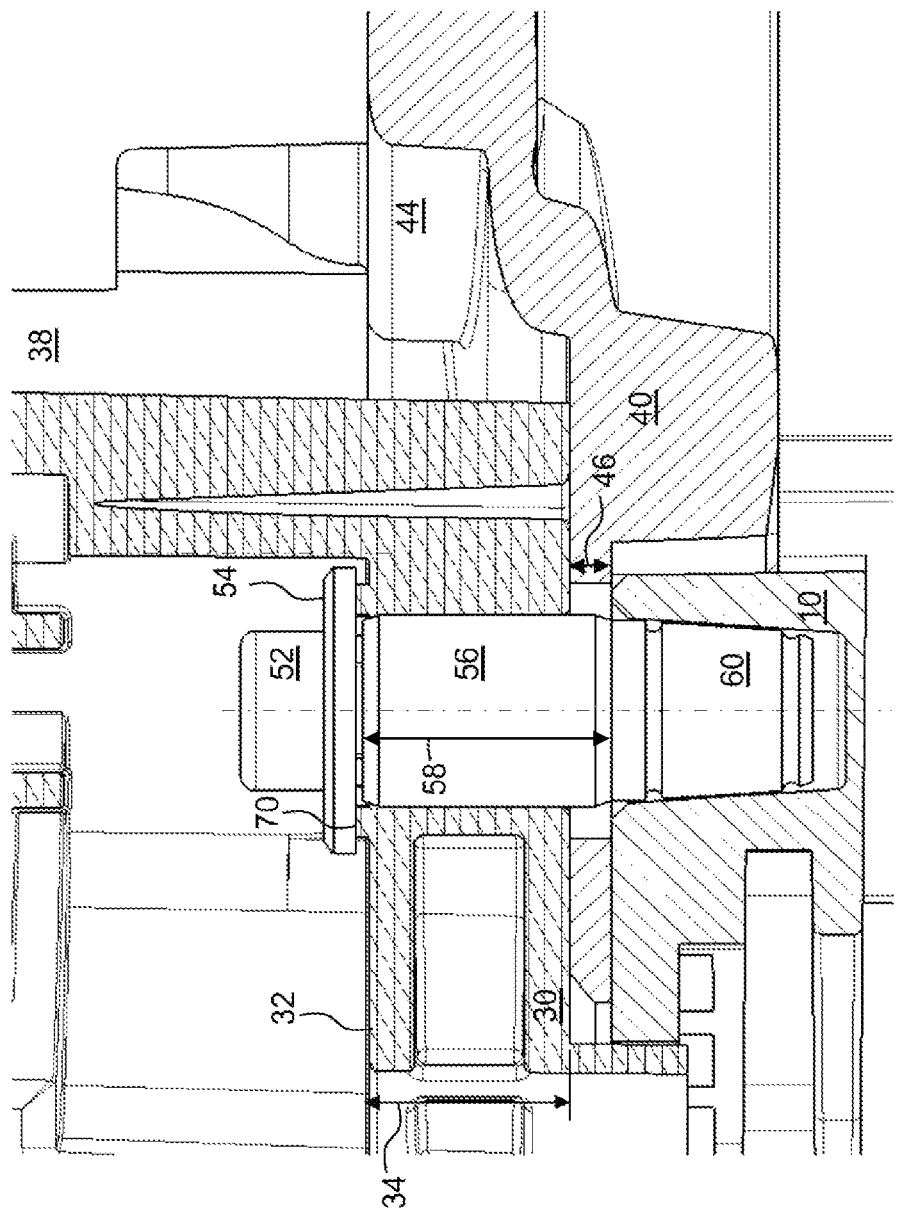
FIG. 9 in section illustration the two cyclone components and the filter housing of the filter device of FIG. 1 before screw-connecting the first cyclone component with the filter housing in case of average tolerances.
Figure 10:
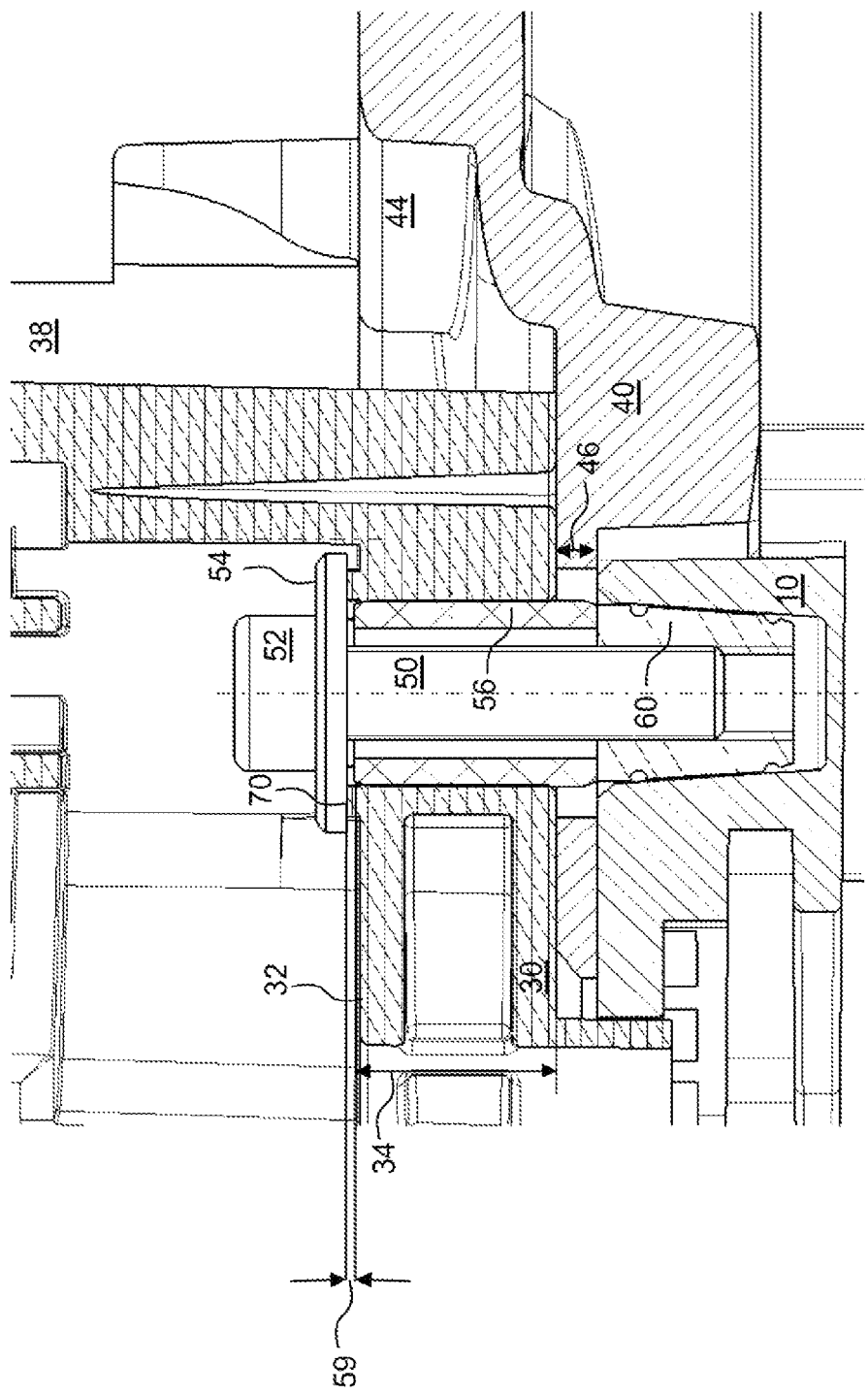
FIG. 10 in section illustration the filter device of FIG. 9 wherein additionally the through bushing and the metal bushing are shown in section.

FIGS. 9 and 10 show the compression of the cyclone top part 30, the cyclone bottom part 40, and the filter housing 10 before tightening the screw 50 in a case of average tolerances of the elements 30, 40, 56, 60 to be screw-connected. In case of the average tolerances, before tightening the screw 50, a nominal gap 59 between the through bushing 56 and the washer 54 exists. This nominal gap 59 is, for example, approximately 0.5-0.8 mm. For simplifying illustration, the nominal gap 59 is marked only in FIG. 10 by means of arrows.

Figure 11:
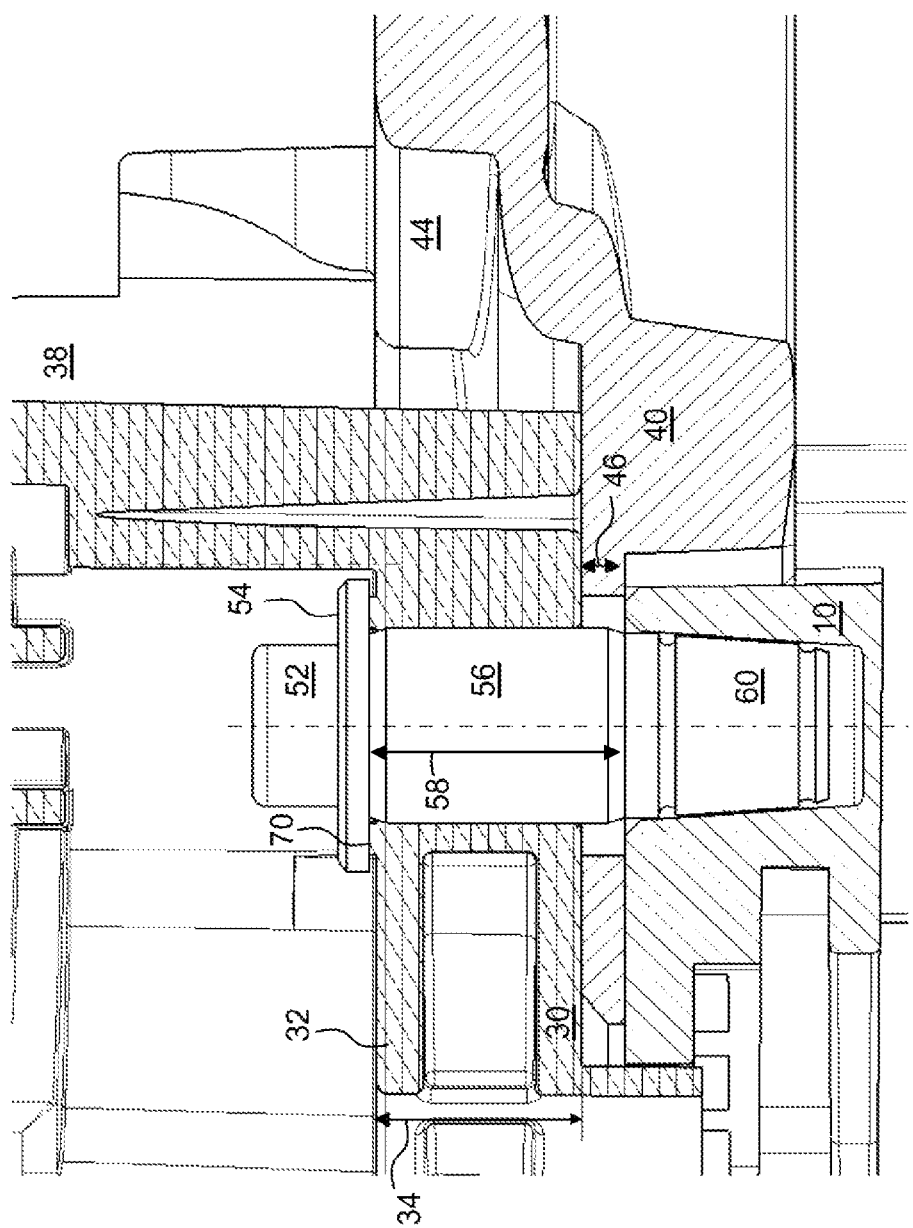
FIG. 11 in section illustration the two cyclone components and the filter housing of the filter device of FIG. 1 after screw-connecting the first cyclone component with the filter housing in case of average tolerances.

FIG. 11 shows the compression of the cyclone top part 30, the cyclone bottom part 40, and the filter housing 10 after tightening the screw 50 in case of the average tolerances of the elements 30, 40, 56, 60 to be screw-connected. The ribs of the compression contour 70 are at least partially compressed or melted. There is no gap formed between the through bushing 56 and the washer 54.

In order to enable easy mounting of the screw 50 and in order to prevent the screw 50 from falling out by itself, the cyclone top part 30 has a captive action device 80. This captive action device for the screw is in particular beneficial in overhead mounting of the cyclone pre-separator 20. Removal of the screw 60 is however still possible with somewhat increased force expenditure.

The captive action device 80 is arranged such on a sidewall 31 of the cyclone top part 30 that in case of an overhead position of the cyclone pre-separator 20 and upon release of the screw 50, the captive action device 80 supports the screw 50 and prevents the screw 50 from falling out of the fastening area 32 of the cyclone top part 30. In this connection, the captive action device 80 is preferably in the form of two projections, for example two holding ribs. These holding ribs 80 can be, for example, made of plastic material and/or a plastic material mixture.

Figure 12:
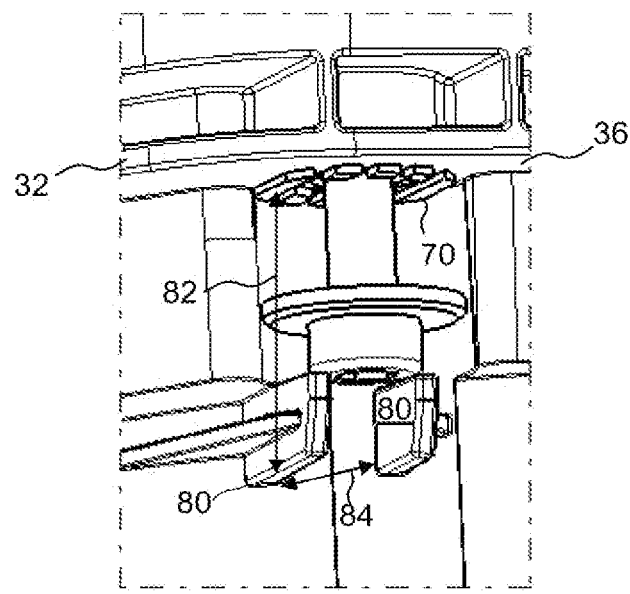
FIG. 12 in perspective illustration the first cyclone component in overhead position, the captive action device and the screw before mounting of the cyclone pre-separator on the filter housing.

FIG. 12 shows the cyclone top part 30 in overhead position wherein the screw 50 as slipped toward the holding ribs 80.

Figure 13:
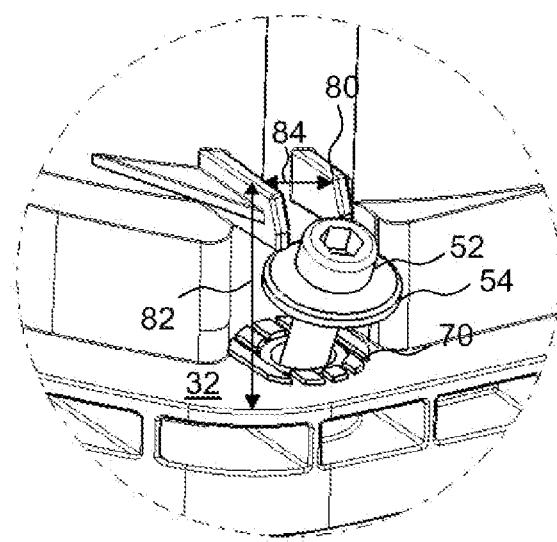
FIG. 13 in perspective illustration the first cyclone component and the captive action device of FIG. 12 as the screw is inserted into the captive action device.

Mounting and removal of the screw 50 in the captive action device 80 is illustrated in FIG. 13. For insertion of the screw 50 into the captive action device 80 the holding ribs 80 are slightly spread apart so that the spacing 84 of the two holding ribs 80 relative to each other is enlarged and the screw can be passed through the holding ribs 80. For removal of the screw 50 out of the captive action device 80, the holding ribs 80 are slightly forced apart again.

Figure 14:
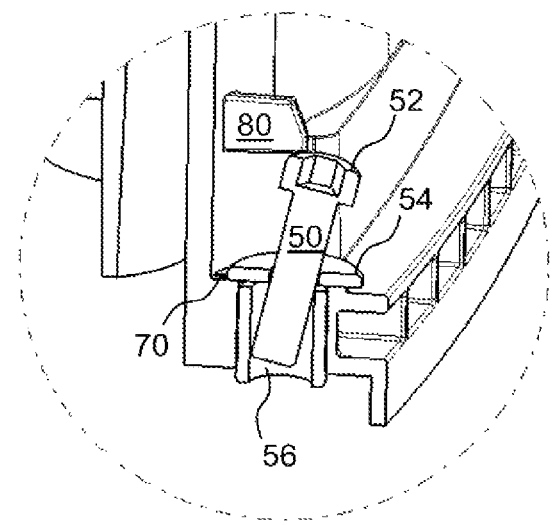
FIG. 14 in section illustration the first cyclone component and the captive action device of FIG. 12 after insertion of the screw into the captive action device.

FIG. 14 shows screw 50 inserted into the through bushing 56 and into the captive action device 80. The holding ribs 80 prevent that the screw 50 can be removed again without force expenditure.

Figure 15:
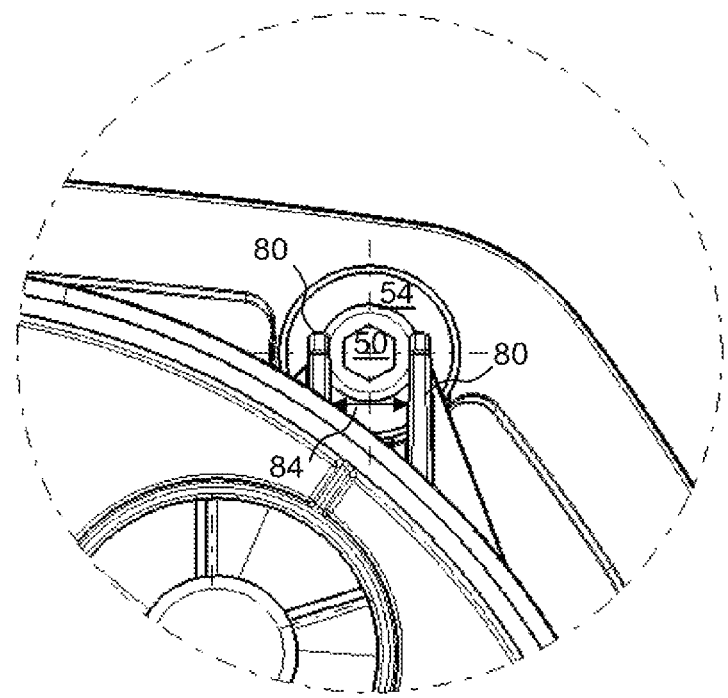
FIG. 15 a plan view of the screw inserted into the captive action device.

In order to facilitate mounting of the screw, the spacing 84 of the two holding ribs 80 relative to each other is large enough so that a wrench matching the screw, for example, a recess wrench such as a hexagon recess wrench, can be inserted between the two holding ribs 80 (compare FIG. 15).

Figure 16:
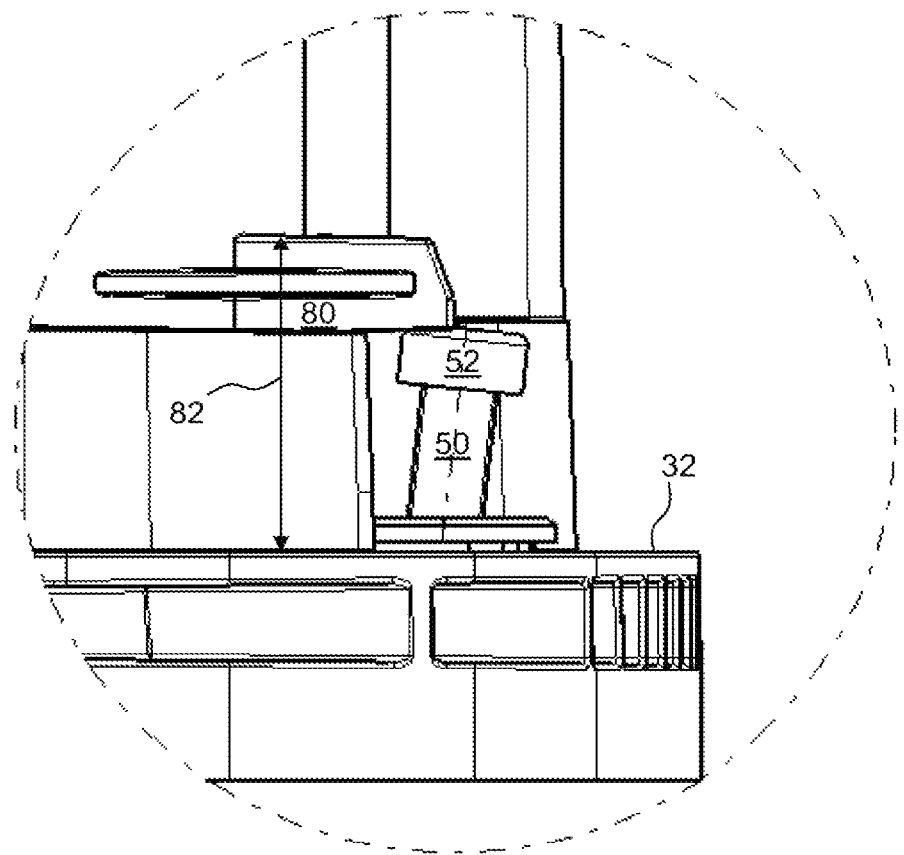
FIG. 16 a side view of the first cyclone component and of the captive action device of FIG. 12 after insertion of the screw into the captive action device.

Moreover, advantageously the spacing 82 of the holding ribs 80 to the fastening area 32 or to the cyclone rim is selected such that the screw 50 can be tightened or loosened with a recess wrench, for example, a hexagon recess wrench. As illustrated in FIG. 16, the spacing 82 of the holding ribs 80 to the fastening area 32 is so large that the short leg of a recess wrench in the mounted state of the screw 15 can pass between the holding ribs 80 and the screw head 52.

Figure 17:
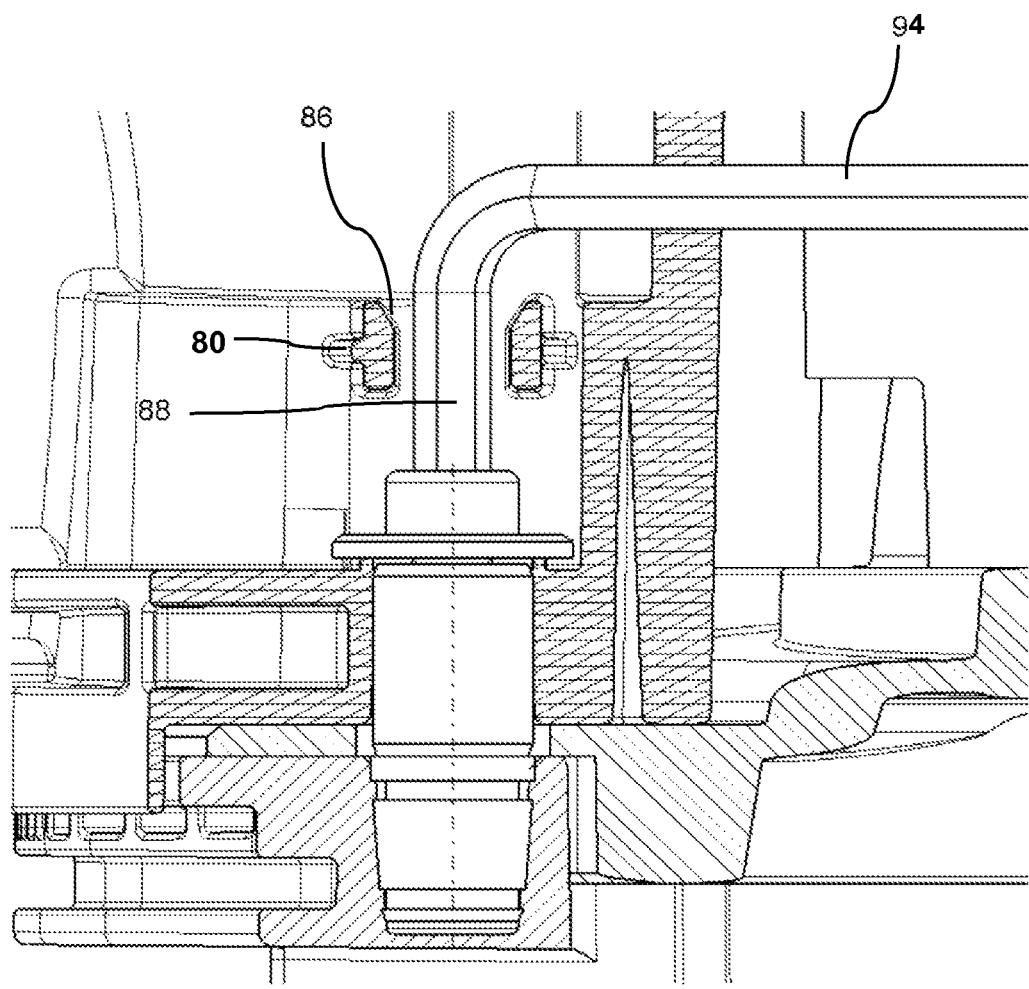
FIG. 17 in section illustration the two cyclone components and the filter housing of the filter device of FIG. 1 in the screw-connected state with a hexagon recess wrench in engagement.

In an advantageous embodiment of the invention illustrated in FIG. 17 the holding ribs 80 have at one edge, preferably at the side that is facing away from the fastening area, a reduced cross-section, in particular in the form of a bevel 86, an insertion ramp of a tapering end or a rounded portion. This has the advantage that the screw can be mounted more easily because the screw head can be pushed through more easily between the holding ribs 80. Advantageously, the holding ribs 80 at a defined spacing to the fastening area are arranged such that a short leg 88 of an angled hexagon recess wrench according to ISO 2936:2001-09 that engages in the mounted state the fastening screw projects past the holding ribs 80 in such a way that the holding ribs 80 are outside of the rotational range of the long part 94 of the hexagon recess wrench.

The present invention enables thus easy mounting and removal of the cyclone pre-separator on the filter housing wherein the two cyclone components 30, 40 even in case of respective tolerances are sufficiently clamped relative to each other. The attachment according to the invention of the cyclone pre-separator 20 on the filter housing 10 is heat-resistant and can withstand the temperatures upon operation of the internal combustion engine without problem.

The invention claimed is:

1. An air filter device for an internal combustion engine, comprising:
    a filter housing having a raw side and a clean side, including
        a raw side inlet for media to be filtered; and
        a clean side outlet for media to be filtered, and
    a front attachment part arranged in the area of said inlet of said filter housing,
    wherein said front attachment part includes
        a first part substantially made of plastic material and having at least one fastening area; and
        a second part;
    wherein said at least one fastening area is attached on said raw side of the filter housing, and
    wherein said second part is clamped between said first part and said filter housing,
    wherein said fastening area of said first part is screw-connected with said filter housing by metallic fastening elements, said metallic fastening elements selected from any of:
        at least one metal bushing arranged in an area of said raw side of the filter housing receiving at least one metallic screw, and
        at least one through bushing arranged in said fastening area of said first part and receiving at least one metallic screw to pass through;
    wherein said fastening area includes
        at least one compression contour having a topside that is facing away from the filter housing and operable to compensate at least one tolerance of dimensions of at least one of the fastening elements to be screw-connected to each other, the compression contour operable to compensate at least one tolerance of:
        a tolerance of the strength of the fastening area;
        a strength of an area of the second part clamped between the fastening area and the filter housing;
        a length of said through bushing;
        a length of said metal bushing;
        wherein said compression contour beginning at said topside of said fastening area, extends in a direction toward a head of said screw, and
        wherein said compression contour is substantially comprised of at least a plastic material that upon application of a force generated by screw-connecting the metallic fastening elements is deformable,
        wherein said application of said force generated by screw-connecting onto said compression contour meltably deforms plastic material of said compression contour;
    wherein said front attachment part is embodied as a cyclone pre-separator that is arranged in an area of said inlet of said filter housing,
    wherein said cyclone pre-separator comprises
        a first cyclone component as a first part; and
        a second cyclone component as a second part.

2. The air filter device according to claim 1, wherein said compression contour has a thickness of 0.5 millimeter (mm) up to 1.5 mm.

3. The air filter device according to claim 1, wherein said compression contour is embodied monolithically together with said fastening area of said first cyclone component, and
wherein said fastening area and said compression contour are made of the same plastic material.

4. The air filter device according to claim 1, wherein said first cyclone component is a cyclone top part that has at least one cell tube, and
wherein said second cyclone component is a cyclone bottom part embodied as an immersion tube plate including at least one immersion tube.

5. The air filter device according to claim 1, wherein said first cyclone component includes at least one captive action device embodied as at least one projection projecting from a sidewall of said first cyclone component and is arranged on a sidewall of said first cyclone component;
wherein upon overhead positioning of said cyclone pre-separator upon release of said screw, said captive action device supports said screw and prevents said screw from falling out of said fastening area of said first cyclone component.

6. The air filter device according to claim 5, wherein said captive action device is arranged at a defined spacing to said fastening area such that a short leg of an angled hexagon recess wrench according to ISO 2936:2001-09 engaging said fastening screw in a mounted state projects past said captive action device in such a way that said captive action device is outside of a rotational range of a long part of the hexagon recess wrench.

7. The air filter device according to claim 5, wherein said captive action device is includes at least two spaced apart projections,
wherein spacing of respective projections relative to each other is smaller than a diameter of said screw head.

8. The air filter device according to claim 7, wherein said captive action device is at least partially made of an elastic plastic material,
wherein said elastic material enables said respective projections to spread apart at least partially to pass said screw through said captive action device.

9. An air filter device for an internal combustion engine, comprising:
    a filter housing having a raw side and a clean side, including
        a raw side inlet for media to be filtered; and
        a clean side outlet for media to be filtered, and
    a front attachment part arranged in the area of said inlet of said filter housing,
    wherein said front attachment part includes
        a first part substantially made of plastic material and having at least one fastening area; and
        a second part;
    wherein said at least one fastening area is attached on said raw side of the filter housing, and
    wherein said second part is clamped between said first part and said filter housing,
    wherein said fastening area of said first part is screw-connected with said filter housing by metallic fastening elements, said metallic fastening elements selected from any of:

at least one metal bushing arranged in an area of said raw side of the filter housing receiving at least one metallic screw, and at least one through bushing arranged in said fastening area of said first part and receiving at least one metallic screw to pass through;

wherein said fastening area includes at least one compression contour having a topside that is facing away from the filter housing and operable to compensate at least one tolerance of dimensions of at least one of the fastening elements to be screw-connected to each other, the compression contour operable to compensate at least one tolerance of:

a tolerance of the strength of the fastening area;

a strength of an area of the second part clamped between the fastening area and the filter housing;

a length of said through bushing;

a length of said metal bushing;

wherein said compression contour beginning at said topside of said fastening area, extends in a direction toward a head of said screw, and wherein said compression contour is substantially comprised of at least a plastic material that upon application of a force generated by screw-connecting the metallic fastening elements is deformable, wherein said application of said force generated by screw-connecting onto said compression contour meltably deforms plastic material of said compression contour;

wherein said compression contour is embodied as at least one rib.

10. The air filter device according to claim 9, wherein said plastic material of said compression contour is meltably deformed by application of a pressure force of approximately 5 to 10 kilo Newton (kN).

* * * * *